(12) United States Patent
Cameron

(10) Patent No.: US 9,650,994 B2
(45) Date of Patent: May 16, 2017

(54) THRUST REVERSER ACTUATOR SYSTEMS

(71) Applicant: The Boeing Company, Chicago, IL (US)

(72) Inventor: Douglas C. Cameron, Ladera Ranch, CA (US)

(73) Assignee: The Boeing Company, Chicago, IL (US)

(*) Notice: Subject to any disclaimer, the term of this patent is extended or adjusted under 35 U.S.C. 154(b) by 295 days.

(21) Appl. No.: 14/447,310

(22) Filed: Jul. 30, 2014

(65) Prior Publication Data

US 2016/0032866 A1 Feb. 4, 2016

(51) Int. Cl.
  *F02K 1/76* (2006.01)
  *F02K 1/56* (2006.01)

(52) U.S. Cl.
  CPC ............... *F02K 1/763* (2013.01); *F02K 1/56* (2013.01); *F02K 1/76* (2013.01); *F02K 1/766* (2013.01)

(58) Field of Classification Search
  CPC ............. F02K 1/76; F02K 1/763; F02K 1/766
  USPC ....................................................... 60/226.2
  See application file for complete search history.

(56) References Cited

U.S. PATENT DOCUMENTS

| 4,563,908 | A  * | 1/1986 | Shube    | F16H 25/20 185/40 R |
| 7,370,468 | B2 * | 5/2008 | Colotte  | F02K 1/763 244/110 B |
| 9,035,584 | B2   | 5/2015 | Cameron  |                     |
| 9,136,782 | B2   | 9/2015 | Benson et al. |                |
| 2003/0159429 | A1 * | 8/2003 | Langston | F02K 1/76 60/226.2 |
| 2011/0108665 | A1 * | 5/2011 | Abrial   | F02C 9/00 244/110 B |
| 2011/0192135 | A1 * | 8/2011 | McKay    | F02K 1/763 60/226.2 |
| 2012/0031071 | A1 * | 2/2012 | Maalioune | B64D 33/04 60/228 |
| 2015/0008854 | A1   | 1/2015 | Cameron  |                     |
| 2015/0326154 | A1   | 11/2015 | Benson et al. |                |

FOREIGN PATENT DOCUMENTS

| WO | 2015002682 | 1/2015 |
| WO | 2015002948 | 1/2015 |

* cited by examiner

*Primary Examiner* — Steven Sutherland
(74) *Attorney, Agent, or Firm* — Hanley, Flight & Zimmerman, LLC

(57) ABSTRACT

Thrust reverser actuator systems are disclosed herein. An example apparatus disclosed herein includes a first controller to communicate with a first flight computer and a second flight computer of an aircraft. The example apparatus also includes a second controller to communicate with the first flight computer and the second flight computer. The example apparatus further includes a thrust reverser and a first electrical actuator coupled to the thrust reverser. The first electrical actuator is to be communicatively coupled to the first controller and the second controller. The example apparatus also includes a second electrical actuator coupled to the thrust reverser. The second electrical actuator is to be communicatively coupled to the second controller. The first electrical actuator and the second electrical actuator are to synchronously actuate the thrust reverser.

19 Claims, 9 Drawing Sheets

THRUST REVERSER ACTUATOR SYSTEMS

FIELD

This disclosure relates generally to thrust reversers and, more particularly, to thrust reverser actuator systems.

BACKGROUND

Traditional aircraft thrust reverser systems employ hydraulic actuators to deploy and retract thrust reversers. When the thrust reversers of an aircraft are deployed, the thrust reversers direct flow of an exhaust stream of one or more engines disposed on the aircraft from aft to forward. The forward flow of the exhaust stream decreases a speed of the aircraft during landing to reduce a stopping distance of the aircraft and/or reduce an amount of brake wear during landing.

SUMMARY

Thrust reverser actuator systems are disclosed herein. An example apparatus disclosed herein includes a first flight computer, a second flight computer, and a first controller to communicate with the first flight computer and the second flight computer. The example apparatus also includes a first electric motor to communicate with the first controller. The example apparatus further includes a second controller to communicate with the first flight computer and the second flight computer. The example apparatus also includes a second electric motor to communicate with the second controller. An aircraft thrust reverser is operatively coupled to the first electric motor and the second electric motor. Each of the first controller and the second controller is to receive a first command from the first flight computer and a second command from the second flight computer. The first controller is to control the first electric motor based on the first command and the second command. The second controller is to control the second electric motor based on the first command and the second command. The first electric motor and the second electric motor are to synchronously move the aircraft thrust reverser.

An example method disclosed herein includes communicating a first command from a first flight computer to a first controller. The first controller is to be communicatively coupled to a first electrical actuator of an aircraft thrust reverser. The example method also includes communicating the first command from the first flight computer to a second controller. The second controller is to be communicatively coupled to a second electrical actuator of the aircraft thrust reverser. The example method further includes communicating a second command from a second flight computer to the first controller and communicating the second command from the second flight computer to the second controller. The example method also includes forwarding at least one of the first command or the second command from the first controller to the second controller and forwarding at least one of the first command or the second command from the second controller to the first controller. The example method also includes deploying the aircraft thrust reverser via the first electrical actuator and the second electrical actuator if the first controller receives the first command from the first flight computer, the second command from the second flight computer, and at least one of the first command or the second command from the second controller.

An example apparatus disclosed herein includes a first controller to communicate with a first flight computer and a second flight computer of an aircraft. The example apparatus also includes a second controller to communicate with the first flight computer and the second flight computer. The example apparatus further includes a thrust reverser and a first electrical actuator coupled to the thrust reverser. The first electrical actuator is to be communicatively coupled to the first controller and the second controller. The example apparatus also includes a second electrical actuator coupled to the thrust reverser. The second electrical actuator is to be communicatively coupled to the second controller. The first electrical actuator and the second electrical actuator are to synchronously actuate the thrust reverser.

Figure 1:
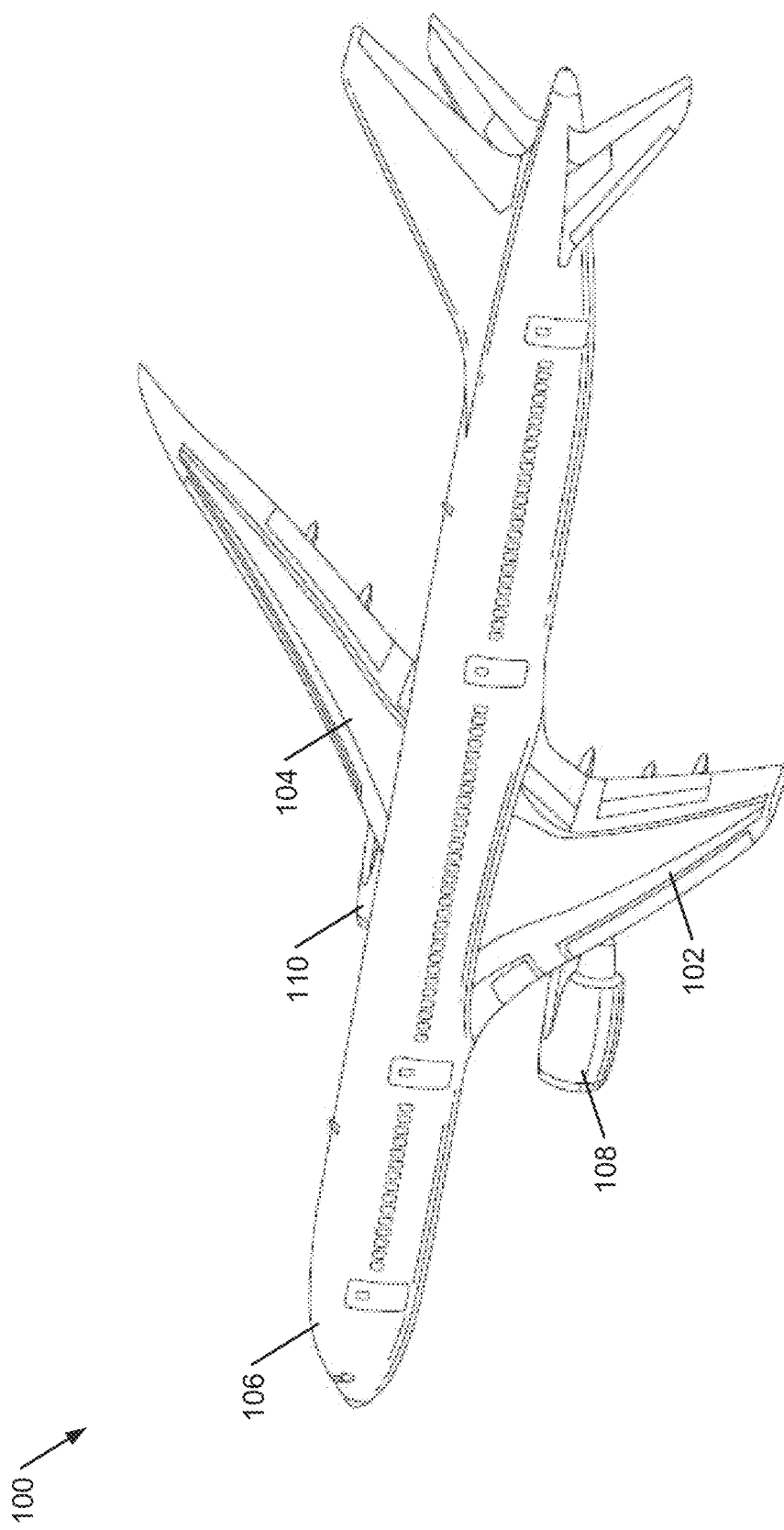
FIG. 1 is a perspective view of an example airplane that may be used to implement the example thrust reverser actuator systems disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Thrust reverser actuator systems are disclosed herein. Some example thrust reverser actuator systems disclosed herein employ a plurality of electric motors to actuate an aircraft thrust reverser. In some examples, two or more electric motors are employed to actuate the aircraft thrust reverser. In some examples, each of the electric motors is in communication with a respective one of a plurality of controllers, and each of the controllers are in communication with a plurality of flight control computers. In some examples, the flight control computers communicate commands to each of the controllers to actuate the aircraft thrust reversers. In some examples, each of the controllers determines if the commands received from the flight control computers match. If the controllers determine that the commands match, each of the controllers forwards one or more of the commands to the other controllers. In some examples, if the controllers receive matching commands from the flight control computers and the other controllers, the controllers command the electric motors to actuate the aircraft thrust reverser. Thus, the example thrust reverser actuator systems disclosed herein perform closed-loop electrical synchronization to deploy and/or retract aircraft thrust reversers.

FIG. 1 is a perspective view of an example aircraft 100, which may be used to implement example methods and apparatus disclosed herein. In the illustrated example, the aircraft 100 includes a first wing 102, a second wing 104 and a fuselage 106. The example aircraft 100 of FIG. 1 includes a first engine 108 and a second engine 110. The example first engine 108 is coupled to the first wing 102. The example second engine 110 is coupled to the second wing 104. As described in greater detail below in conjunction with FIGS. 2-3, a first thrust reverser 202 (FIG. 2) is operatively coupled to the first engine 108, and a second thrust reverser 204 (FIG. 2) is operatively coupled to the second engine 110. In some examples, each of the first and second thrust reversers 202, 204 includes two sliding elements for controlling the exhaust stream. For example, the first thrust reverser 202 includes a first sliding element disposed proximate to a left side of the first engine 108 and a second sliding element disposed proximate to a right side of the first engine 108. The first and second sliding elements can deploy and retract at substantially the same time, however, other thrust reverser combinations are also possible to direct the exhaust stream (e.g., only one of the first or the second sliding elements may deploy or retract, resulting in asymmetric thrust conditions). Although the following examples are discussed in conjunction with the example aircraft 100 of FIG. 1, other examples may be implemented on any type of aircraft.

Figure 2:
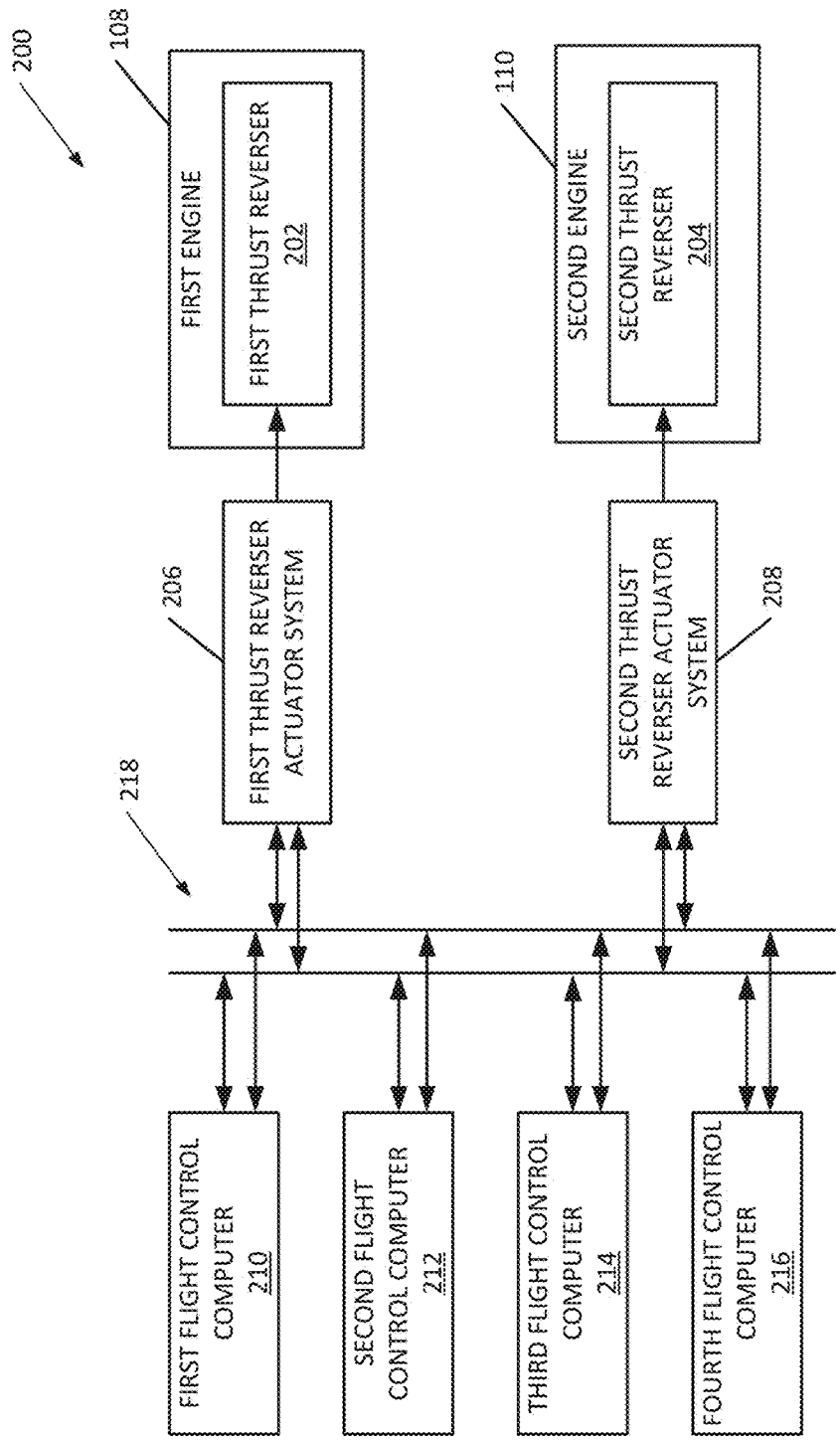
FIG. 2 is a block diagram of an example first thrust reverser actuator system and an example second thrust reverser actuator system employed on the example aircraft of FIG. 1.

FIG. 2 is a block diagram representative of an example thrust reverser system 200 of the example aircraft 100 of FIG. 1. In the illustrated example, the thrust reverser system 200 includes a first thrust reverser 202 and a second thrust reverser 204. The example first thrust reverser 202 of FIG. 2 is operatively coupled to the first engine 108. The example second thrust reverser 204 of FIG. 2 is operatively coupled to the second engine 110. In the illustrated example, a first thrust reverser actuator system 206 is coupled to the example first thrust reverser 202. The example first thrust reverser actuator system 206 of FIG. 2 actuates and/or controls the example first thrust reverser 202. For example, the first thrust reverser actuator system 206 may deploy the first thrust reverser 202, retract the first thrust reverser 202, retain the first thrust reverser 202 in a fully retracted or a fully deployed position, and/or actuate the first thrust reverser 202 in one or more different and/or alternative ways. When the example first thrust reverser 202 is deployed during landing, the first thrust reverser 202 diverts and/or directs an exhaust flow of the first engine 108 forward to decelerate the aircraft 100.

In the illustrated example, a second thrust reverser actuator system 208 is coupled to the example second thrust reverser 204. The example second thrust reverser actuator system 208 of FIG. 2 actuates and/or controls the example second thrust reverser 204. For example, the second thrust reverser actuator system 208 may deploy the second thrust reverser 204, retract the second thrust reverser 204, retain the second thrust reverser 204 in a fully retracted or a fully deployed position, and/or move the second thrust reverser 204 in one or more different and/or alternative ways. When the example second thrust reverser 204 is deployed during landing, the second thrust reverser 204 diverts and/or directs an exhaust flow of the second engine 110 forward to decelerate the aircraft 100.

In the illustrated example, each of the first thrust reverser actuator system 206 and the second thrust reverser actuator system 208 is communicatively coupled to a first flight control computer (FCC) 210, a second flight control computer (FCC) 212, a third flight control computer (FCC) 214, and a fourth flight control computer (FCC) 216 via a first bus 218. The example first bus 218 may be implemented by, for example, an Ethernet bus, a MIL-STD-1553 bus and/or any bus and/or communication link. Other examples employ other numbers of flight control computers (e.g., 1, 2, 3, 5, 6, etc.) In the illustrated example, each of the first FCC 210, the second FCC 212, the third FCC 214, and the fourth FCC 216 communicates commands (e.g., deployment commands, retraction commands, and/or one or more different and/or alternative commands) to the first thrust reverser actuator system 206 and the second thrust reverser actuator system 208. In the illustrated example, the first thrust reverser actuator system 206 and the second thrust reverser actuator system 208 of FIG. 2 synchronously actuate the first thrust reverser 202 and the second thrust reverser 204, respectively, in response to the commands.

Figure 3:
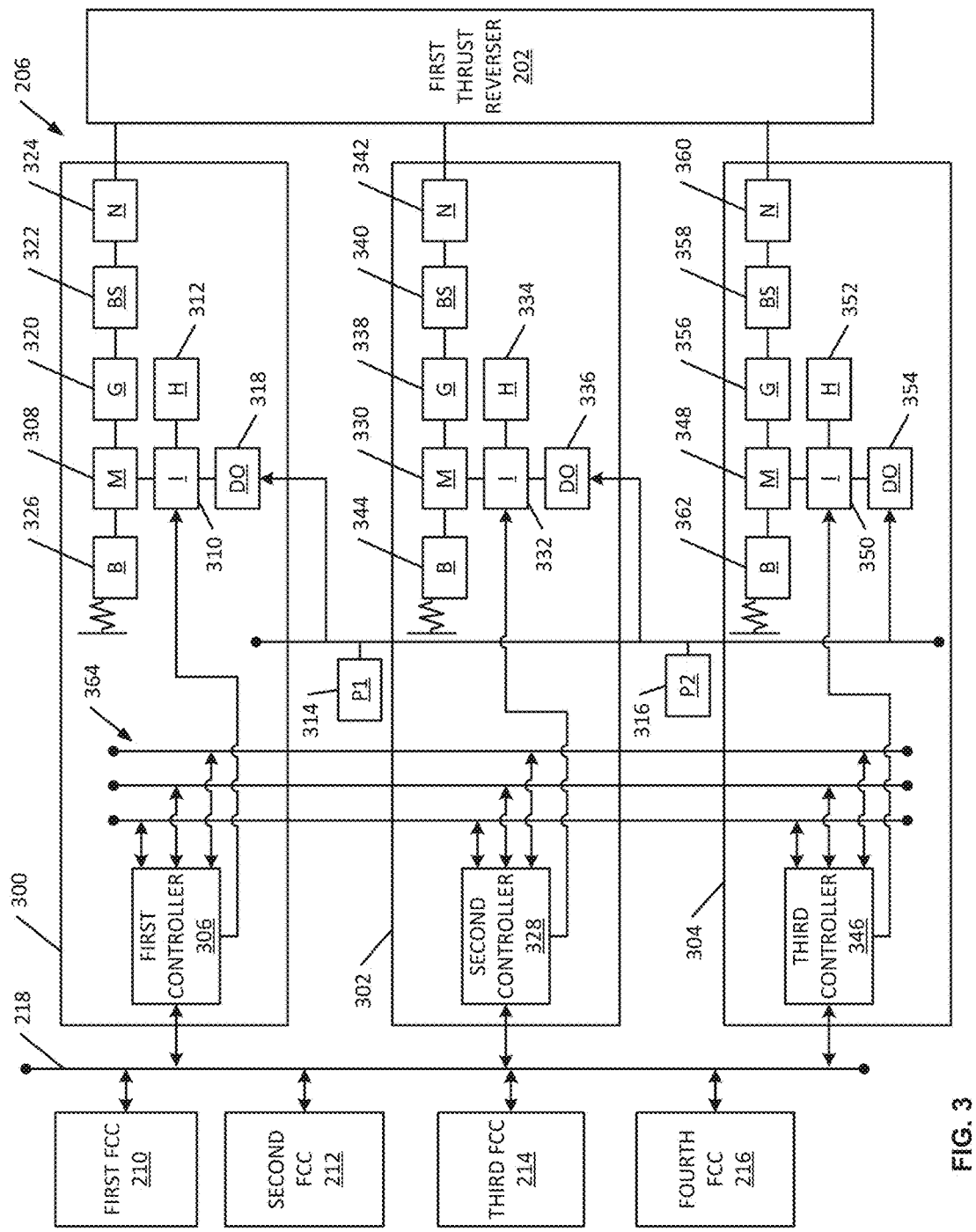
FIG. 3 is a block diagram of the example first thrust reverser actuator system of FIG. 2 having three example electrical actuators to actuate a first thrust reverser.

FIG. 3 illustrates a first electrical actuator 300, a second electrical actuator 302 and a third electrical actuator 304 of the example first thrust reverser actuator system 206 disclosed herein. The example first thrust reverser actuator system 206 and the example second thrust reverser actuator system 208 are substantially similar or identical. Thus, the following description of the example first thrust reverser actuator system 206 is applicable to the example second thrust reverser actuator system 208. Therefore, to avoid redundancy, the example second thrust reverser system 208 is not separately described herein.

In the illustrated example, the first electrical actuator 300 includes a first controller 306 communicatively coupled to the first FCC 210, the second FCC 212, the third FCC 214, and the fourth FCC 216. The example first controller 306 is operatively coupled to a first electric motor 308 a first inverter 310 and a first regeneration dump circuit or heater 312. In the illustrated example, a first power supply 314 and/or a second power supply 316 supplies power to the first electric motor 308 via a first diode or circuit 318. In some examples, the first diode 318 does not have regenerative capabilities. The example first electric motor 308 may be implemented by a brushless direct current (DC) motor, a permanent magnet motor, and/or one or more additional and/or alternative electric motors.

In the illustrated example, a first transmission 320 is operatively coupled to the first electric motor 308. In some examples, the first transmission 320 includes spur gears, helical gears and/or one or more additional and/or alternative components. In some examples, the first transmission 320 has a gear reduction gear ratio. In the illustrated example, the first transmission 320 is operatively coupled to a first ball screw 322 and a first drive nut 324. The example first drive nut 324 of FIG. 3 is operatively coupled to the first thrust reverser 202. In other examples, one or more different and/or alternative linear actuators are operatively coupled to the first transmission 320 and the first thrust reverser 202.

In the illustrated example, the first electric motor 308 is energized via the first power supply 314 and/or the second power supply 316 to output a first torque to rotate the first ball screw 322 via the first transmission 320. As a result, the example first drive nut 324 translates along the first ball screw 322 to move (e.g., retract, deploy, etc.) the first thrust reverser 202.

The example first electrical actuator 300 of FIG. 3 includes a first brake 326 operatively coupled to the first electrical motor 308. In some examples, the first brake 326 is an electromagnetic brake. In the illustrated example, the first brake 326 arrests and/or prevents rotation of the first electric motor 308 when the first brake 326 is energized and/or engaged. As a result, the example first brake 326 substantially prevents movement of the example first thrust reverser 202 via the first electric motor 308. In some examples, the first brake 326 is energized and/or engaged until the first inverter 310 receives a first brake release command from the first controller 306. When the first inverter 310 receives the first brake release command, the example first brake 326 disengages and/or de-energizes to enable the first electric motor 308 to actuate the first thrust reverser 202 to a commanded position. When the first thrust reverser 202 reaches the commanded position, the first brake 326 reengages and/or reenergizes to arrest the example first electric motor 308 and, thus, retain the first thrust reverser 202 in the commanded position. In some examples, when the example first brake 326 is energized and/or engaged, the example first brake 326 substantially prevents movement of the first thrust reverser 202 even if the second electrical actuator 302 and/or the third electrical actuator 304 applies force to the first thrust reverser 202 to actuate the first thrust reverser 202.

In the illustrated example, the second electrical actuator 302 includes a second controller 328 communicatively coupled to the first FCC 210, the second FCC 212, the third FCC 214, and the fourth FCC 216. The example second controller 328 is operatively coupled to a second electric motor 330 via a second inverter 332 and a second regeneration dump circuit or heater 334. In the illustrated example, the first power supply 314 and/or the second power supply 316 supplies power to the second electric motor 330 via a second diode or circuit 336. In some examples, the second diode 336 does not have regenerative capabilities. The example second electric motor 330 may be implemented by a brushless direct current (DC) motor, a permanent magnet motor, and/or one or more additional and/or alternative electric motors.

In the illustrated example, a second transmission 338 is operatively coupled to the second electric motor 330. In some examples, the second transmission 338 includes spur gears, helical gears and/or one or more additional and/or alternative components. In some examples, the second transmission 338 has a gear reduction gear ratio. In the illustrated example, the second transmission 338 is operatively coupled to a second ball screw 340 and a second drive nut 342. The example second drive nut 342 of FIG. 3 is operatively coupled to the first thrust reverser 202. In other examples, one or more different and/or alternative linear actuators are operatively coupled to the second transmission 338 and the first thrust reverser 202.

In the illustrated example, the second electric motor 330 is energized via the first power supply 314 and/or the second power supply 316 to output a second torque to rotate the second ball screw 340 via the second transmission 338. As a result, the example second drive nut 342 translates along the example second ball screw 340 to move (e.g., retract, deploy, etc.) the first thrust reverser 202.

The example second electrical actuator 302 of FIG. 3 includes a second brake 344 operatively coupled to the second electrical motor 330. In some examples, the second brake 344 is an electromagnetic brake. In the illustrated example, the second brake 344 arrests and/or prevents rotation of the second electric motor 330 when the second brake 344 is energized and/or engaged. As a result, the example second brake 344 substantially prevents movement of the example first thrust reverser 202 via the second electric motor 330. In some examples, the second brake 344 is energized and/or engaged until the second inverter 332 receives a second brake release command from the second controller 328. In some examples, when the second inverter 332 receives the second brake release command, the example second brake 344 disengages and/or de-energizes to enable the second electric motor 330 to actuate the first thrust reverser 202 to a commanded position. When the example first thrust reverser 202 reaches the commanded position, the second brake 344 reengages and/or reenergizes to arrest the example second electric motor 330 and, thus, retain the first thrust reverser 202 in the commanded position. In some examples, when the example second brake 344 is energized and/or engaged, the example second brake 344 substantially prevents movement of the first thrust reverser 202 even if the first electrical actuator 300 and/or the third electrical actuator 304 applies force to the first thrust reverser 202 to actuate the first thrust reverser 202.

In the illustrated example, the third electrical actuator 304 includes a third controller 346 communicatively coupled to the first FCC 210, the second FCC 212, the third FCC 214, and the fourth FCC 216. The example third controller 346 is operatively coupled to a third electric motor 348 via a third inverter 350 and a third regeneration dump circuit or heater 352. In the illustrated example, the first power supply 314 and/or the second power supply 316 supplies power to the third electric motor 348 via a third diode or circuit 354. In some examples, the third diode 354 does not have regenerative capabilities. The example third electric motor 348 may be implemented by a brushless direct current (DC) motor, a permanent magnet motor, and/or one or more additional and/or alternative electric motors.

In the illustrated example, a third transmission 356 is operatively coupled to the third electric motor 348. In some examples, the third transmission 356 includes spur gears, helical gears and/or one or more additional and/or alternative components. In some examples, the third transmission 356 has a gear reduction gear ratio. In the illustrated example, the third transmission 356 is operatively coupled to a third ball screw 358 and a third drive nut 360. The example third drive nut 360 of FIG. 3 is operatively coupled to the first thrust reverser 202. In other examples, one or more different and/or alternative linear actuators are operatively coupled to the third transmission 356 and the first thrust reverser 202.

In the illustrated example, the third electric motor 348 is energized via the first power supply 314 and/or the second power supply 316 to output a third torque to rotate the third ball screw 358 via the third transmission 356. As a result, the example third drive nut 360 translates along the example third ball screw 358 to move (e.g., retract, deploy, etc.) the first thrust reverser 202.

The example third electrical actuator 304 of FIG. 3 includes a third brake 362 operatively coupled to the third electrical motor 348. In some examples, the third brake 362 is an electromagnetic brake. In the illustrated example, the third brake 362 arrests and/or prevents rotation of the third electric motor 348 when the third brake 362 is energized and/or engaged. As a result, the example third brake 362 substantially prevents movement of the example first thrust reverser 202 via the third electric motor 348. In some examples, the third brake 362 is energized and/or engaged until the third inverter 350 receives a third brake release command from the third controller 346. When the example third inverter 350 receives the third brake release command, the example third brake 362 disengages and/or de-energizes to enable the example third electric motor 348 to actuate the first thrust reverser 202 to a commanded position. When the first thrust reverser 202 reaches the commanded position, the third brake 362 reengages and/or reenergizes to arrest the example third electric motor 348 and, thus, retain the first thrust reverser 202 in the commanded position. In some examples, when the example third brake 362 is energized and/or engaged, the example third brake 362 substantially prevents movement of the first thrust reverser 202 even if the first electrical actuator 300 and/or the second electrical actuator 302 applies force to the first thrust reverser 202 to actuate the first thrust reverser 202.

In the illustrated example, the first controller 306, the second controller 328, and the third controller 346 are communicatively coupled via a second bus or cross data channel links 364. The second bus 364 may be implemented by a serial peripheral interface (SPI) bus, an inter-integrated circuit (I²C), and/or any other bus and/or communication link(s). To actuate (e.g., deploy, retract, move to a commanded position, etc.) the example first thrust reverser 202, the example first controller 306 communicates the first brake release command and a first torque command to the first inverter 310; the example second controller 328 communicates the second brake release command and a second torque command to the second inverter 332; and the third controller 346 communicates the third brake release command and a third torque command to the third inverter 252. As a result, the first electric motor 308, the second electric motor 330, and the third electric motor 348 generate torque to actuate the example first thrust reverser 202.

In some examples, the first controller 306, the second controller 328 and the third controller 346 communicate with each other and the FCCs 210, 212, 214, 216 to synchronously control the first electric motor 308, the second electric motor 330 and the third electric motor 348. For example, the first electrical actuator 300, the second electrical actuator 302 and the third electrical actuator 304 move the first thrust reverser 202 if each of the first controller 306, the second controller 328 and the third controller 346 receive matching commands to move the first thrust reverser 202. In the illustrated example, the first controller 306 communicates the first brake release command and the first torque command if the first controller 306 receives matching commands from the FCCs 210, 212, 214, 216, the second controller 328 and the third controller 346. The example second controller 328 communicates the second brake release command and the second torque command if the second controller 328 receives matching commands from the FCCs 210, 212, 214, 216, the first controller 306 and the third controller 346. Similarly, the example third controller 346 communicates the third brake release command and the third torque command if the third controller 346 receives matching commands from the FCCs 210, 212, 214, 216, the first controller 306 and the second controller 328.

For example, each of the first FCC 210, the second FCC 212, the third FCC 214 and the fourth FCC 216 communicate commands to each of the first controller 306, the second controller 328 and the third controller 346. For example, the first FCC 210 may communicate a first command to each of the first controller 306, the second controller 328 and the third controller 346. The example second FCC 212 may communicate a second command to each of the first controller 306, the second controller 328 and the third controller 346. The example third FCC 214 may communicate a third command to each of the first controller 306, the second controller 328 and the third controller 346. The example fourth FCC 216 may communicate a fourth command to each of the first controller 306, the second controller 328 and the third controller 346.

In response to receiving all of the first, second, third and fourth commands, each of the example first controller 306, the example second controller 328, and the example third controller 346 determines if the first, second, third and fourth commands match. In some examples, the first, second, third and fourth commands match if each of the first, second, third and fourth commands is a command to deploy the first thrust reverser 202, retract the first thrust reverser 202, move the first thrust reverser 202 to a same commanded position, and/or if the first, second, third and fourth commands match in one or more additional and/or alternative ways.

If the example first controller 306 determines that the first, second, third and fourth commands match, the first controller 306 communicates, repeats and/or forwards one or more of the first, second, third or fourth commands to the second controller 328 and the third controller 346. If the example second controller 328 determines that the first, second, third and fourth commands match, the second controller 328 communicates, repeats and/or forwards one or more of the first, second, third or fourth commands to the first controller 306 and the third controller 346. If the example third controller 346 determines that the first, second, third and fourth commands match, the third controller 346 communicates, repeats and/or forwards one or more of the first, second, third or fourth commands to the first controller 306 and the second controller 328.

In the illustrated example, the first controller 306 communicates the first brake release command and the first torque command to the first inverter 310 if the first controller 306 receives all of 1) the first command from the first FCC 210, 2) the second command from the second FCC 212, 3) the third command from the third FCC 214, 4) the fourth command from the fourth FCC 216, 5) at least one of the first, second, third or fourth commands from the second controller 328 and 6) at least one of the first, second, third or fourth commands from the third controller 346. Thus, the example first controller 306 communicates the first brake release command and the first torque command if, and in some examples, only if, the first controller 306 receives matching commands from the FCCs 210, 212, 214, 216, the second controller 328 and the third controller 346.

The example second controller 328 communicates the second brake release command and the second torque command to the second inverter 332 if the second controller 328 receives all of 1) the first command from the first FCC 210, 2) the second command from the second FCC 212, 3) the third command from the third FCC 214, 4) the fourth command from the fourth FCC 216, 5) at least one of the first, second, third or fourth commands from the first controller 306 and 6) at least one of the first, second, third or fourth commands from the third controller 346. Thus, the example second controller 328 communicates the second brake release command and the second torque command if the second controller 328 receives matching commands from the FCCs 210, 212, 214, 216, the first controller 306 and the third controller 346.

The example third controller 346 communicates the third brake release command and the third torque command to the third inverter 350 if the third controller 346 receives all of 1) the first command from the first FCC 210, 2) the second command from the second FCC 212, 3) the third command from the third FCC 214, 4) the fourth command from the fourth FCC 216, 5) at least one of the first, second, third or fourth commands from the first controller 306 and 6) at least one of the first, second, third or fourth commands from the second controller 328. Thus, the first thrust reverser 202 is moved via the first electrical actuator 300, the second electrical actuator 302 and the third electrical actuator 304 if each of the first controller 306, the second controller 328 and the third controller 346 receive matching commands to move the first thrust reverser 202. Thus, the example third controller 346 communicates the third brake release command and the third torque command if the third controller 346 receives matching commands from the FCCs 210, 212, 214, 216, the first controller 306 and the second controller 328.

In some examples, the first controller 306, the second controller 328 and the third controller 346 command the first electric motor 308, the second electric motor 330 and the third electric motor 348, respectively, to output a same amount of torque. Thus, in some examples, the first controller 306, the second controller 328 and the third controller 346 synchronize torque outputs of the first electric motor 308, the second electric motor 330 and the third electric motor 348. Synchronization of the torque outputs of the first electric motor 308, the second electric motor 330, and the third electric motor 348, all of which act upon a mechanical end effector via rigid links (e.g., the ball screws 322, 340, 356, the drive nuts 324, 342, 360), prevents force conflict between the first, second, and third electric motors 308, 330, 348 and servo loop electronics of the first thrust reverse system 206 that monitor the motors 308, 330, 348. A force conflict occurs when one motor (e.g., one of the first, second, or third electric motors 308, 330, 348) imposes a positive force on the end effector while another motor (e.g., another of the first, second, or third electric motors 308, 330, 348) imposes a negative force on the end effector. Although the two opposing forces may sum to a desired net force, the opposing forces create inefficiencies and can overstrain the mechanical and electrical elements of the first thrust reverser actuation system 206 as the two motors each attempt to affect the first thrust reverser 202. However, when each of the first, second, and third motors 308, 330, 348 generates the same torque, the first, second, and third electric motors 308, 330, 348 work together without causing inadvertent binding or overstrain of the first thrust reverser actuation system 206.

In some examples, each of the first, second, and third electric motors 308, 330, 348 has one or more current sensors that are associated with the windings of the motors to track current commands or torque commands of the respective motors. As torque and current are directly and linearly proportional, controlling the current in, for example, the motor windings of the first electric motor 308 directly controls the torque output of the first electric motor 308. In the example first thrust reverser system 206, each of the first, second, and third controllers 306, 328, 346 connected to the first thrust reverser 202 operates based on the same torque command using the proportional relationship between current and torque.

To generate a common torque command for each of the first, second, and third controllers 306, 328, 346, a midvalue torque calculation is performed by the first, second, and third controllers 306, 328, 346. For example, the first controller 306 computes a first local torque command from a servo loop associated with the first motor 308. The servo loop of the first motor 308 tracks commands communicated by, for example, the FCCs 210, 212, 214, 216 related to electric motor rate and position using one or more feedback sensors, such as Hall effect sensors or a motor rotor resolver. The first controller 306 communicates the first local torque command to the second controller 328 and the third controller 346. Similarly, the second controller 328 computes a second local torque command for the second motor 330 that is communicated the first controller 306 and the third controller 346. The third controller 346 computes a third local torque command for the third motor 348 that is communicated to the first controller 306 and the second controller 328.

In the example first thrust reverser system 206, each motor controller 306, 328, 346 receives torque commands from the two other controllers. For example, the first controller 306 receives the second local torque command from the second controller 328 and the third local torque command from the third controller 346. Based on the three torque commands (e.g., the first local torque command computed by the first controller 306 and the second and third local torque commands received from the second and third controllers 328, 346, respectively), the first controller 306 computes a median value or midvalue of the three torque commands and uses the median value of the three commands to determine a first torque to be output by the first electric motor 308 (e.g., by controlling the current in the motor windings of the first motor 308). The example first controller 306 communicates the first torque command to the first inverter 310 to cause the first electric motor 308 to output the first torque.

The second controller 328 and the third controller 346 implement the midvalue method as described in connection with the first controller 306. The second controller 328 computes a median value of second local torque command, the first local torque command received from the first controller 308, and the third local torque command received from the third controller 346 and uses the median value of the three commands to determine a second torque to be output by the second electric motor 330. The example second controller 328 communicates the second torque command to the second inverter 332 to cause the second electric motor 330 to output the second torque.

The third controller 346 computes a median value of the third local torque command, the first local torque command received from the first controller 308, and the second local torque command received from the second controller 328 and uses the median value of the three commands to determine a third torque to be output by the third electric motor 348. The example third controller 346 communicates the third torque command to the third inverter 350 to cause the third electric motor 348 to output the third torque.

As a result of the midvalue method, the first electric motor 308, the second electric motor 330 and the third electric motor 348 output a substantially same amount of torque because each of the first electric motor 308, the second electric motor 330, and the third electric motor 348 output a torque corresponding to the midvalue of the first local torque command, the second local torque command, and the third local torque command. Thus, the midvalue method provides for synchronization between the torque outputs of the first, second, and third motors 308, 330, 348.

In some examples, only two motor controllers are used for torque synchronization. In such examples, an average torque command calculated from the local torque values of the two motor controllers is used to command the electric motors associated with each of the two motor controllers (e.g., by controlling the current in the motor windings of the motors).

In other examples involving only two motor controllers, a pseudo midvalue torque command is used to command the electric motors. The pseudo midvalue torque command is determined by taking the midvalue of (1) torque commands calculated a first time period (e.g., a current time period) and (2) midvalued torque commands calculated at a second time period occurring prior to the first time period. Thus, the midvalue method allows for flexibility in torque synchronization based on, for example, the number of motor controllers.

While an example manner of implementing the example first thrust reverser actuator system 206 of FIG. 2 and/or the example second thrust reverser actuator system 208 is illustrated in FIG. 3, one or more of the elements, processes and/or devices illustrated in FIG. 3 may be combined, divided, re-arranged, omitted, eliminated and/or implemented in any other way. Further, the first flight control computer 210, the second flight control computer 212, the third flight control computer 214, the fourth flight control computer 216, the first electrical actuator 300, the second electrical actuator 302, the third electrical actuator 304, the first controller 306, the first electric motor 308, the first diode 318, the first inverter 310, the first regeneration dump circuit 312, the second power supply 314, the second power supply 316, the first transmission 320, the first ball screw 322, the first drive nut 324, the first brake 326, the second controller 328, the second electric motor 330, the second diode 336, the second inverter 332, the second regeneration dump circuit 334, the second transmission 338, the second ball screw 340, the second drive nut 342, the second brake 344, the third controller 346, the third electric motor 348, the third diode 354, the third inverter 350, the third regeneration dump circuit 352, the third transmission 356, the third ball screw 358, the third drive nut 360, the third brake 362, and/or, more generally, the example first thrust reverser actuator system 206 of FIG. 3 may be implemented by hardware, software, firmware and/or any combination of hardware, software and/or firmware. Thus, for example, any of the example the first flight control computer 210, the second flight control computer 212, the third flight control computer 214, the fourth flight control computer 216, the first electrical actuator 300, the second electrical actuator 302, the third electrical actuator 304, the first controller 306, the first electric motor 308, the first diode 318, the first inverter 310, the first regeneration dump circuit 312, the first power supply 314, the second power supply 316, the first transmission 320, the first ball screw 322, the first drive nut 324, the first brake 326, the second controller 328, the second electric motor 330, the second diode 336, the second inverter 332, the second regeneration dump circuit 334, the second transmission 338, the second ball screw 340, the second drive nut 342, the second brake 344, the third controller 346, the third electric motor 348, the third diode 354, the third inverter 350, the third regeneration dump circuit 352, the third transmission 356, the third ball screw 358, the third drive nut 360, the third brake 362, and/or, more generally, the example first thrust reverser actuator system 206 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the first flight control computer 210, the second flight control computer 212, the third flight control computer 214, the fourth flight control computer 216, the first electrical actuator 300, the second electrical actuator 302, the third electrical actuator 304, the first controller 306, the first electric motor 308, the first diode 318, the first inverter 310, the first regeneration dump circuit 312, the first power supply 314, the second power supply 316, the first transmission 320, the first ball screw 322, the first drive nut 324, the first brake 326, the second controller 328, the second electric motor 330, the second diode 336, the second inverter 332, the second regeneration dump circuit 334, the second transmission 338, the second ball screw 340, the second drive nut 342, the second brake 344, the third controller 346, the third electric motor 348, the third diode 354, the third inverter 350, the third regeneration dump circuit 352, the third transmission 356, the third ball screw 358, the third drive nut 360, the third brake 362, and/or, more generally, the example first thrust reverser actuator system 206 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example first thrust reverser actuator system 206 of FIG. 3 may include one or more elements, processes and/or devices in addition to, or instead of, those illustrated in FIG. 3, and/or may include more than one of any or all of the illustrated elements, processes and devices.

Flowcharts representative of example methods for implementing the example first thrust reverser actuator system 206 of FIG. 3 is shown in FIGS. 4-7. In these example, the methods may be implemented using machine readable instructions comprising a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example methods are described with reference to the flowcharts illustrated in FIGS. 4-7, many other methods of implementing the example first thrust reverser actuator system 206 may alternatively be used. For example, the order of execution of the blocks may be changed, and/or some of the blocks described may be changed, eliminated, or combined.

As mentioned above, the example methods of FIGS. 4-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase at "least" is used as the transition term in a preamble of a claim, it is open-ended in the same manner as the term "comprising" is open ended.

Figure 4:
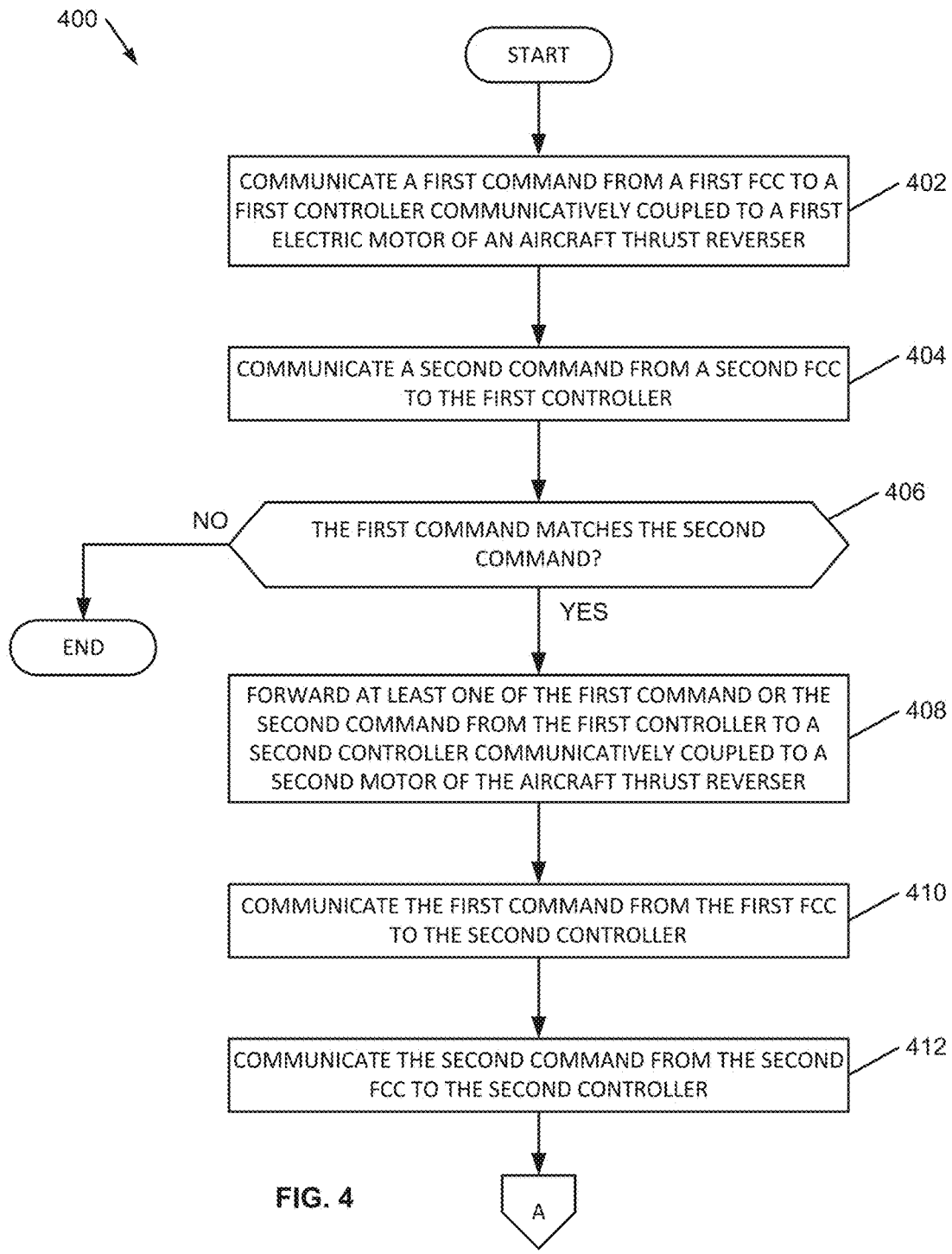
FIGS. 4-5 are flowcharts representative of an example method disclosed herein to actuate a thrust reverser.
Figure 5:
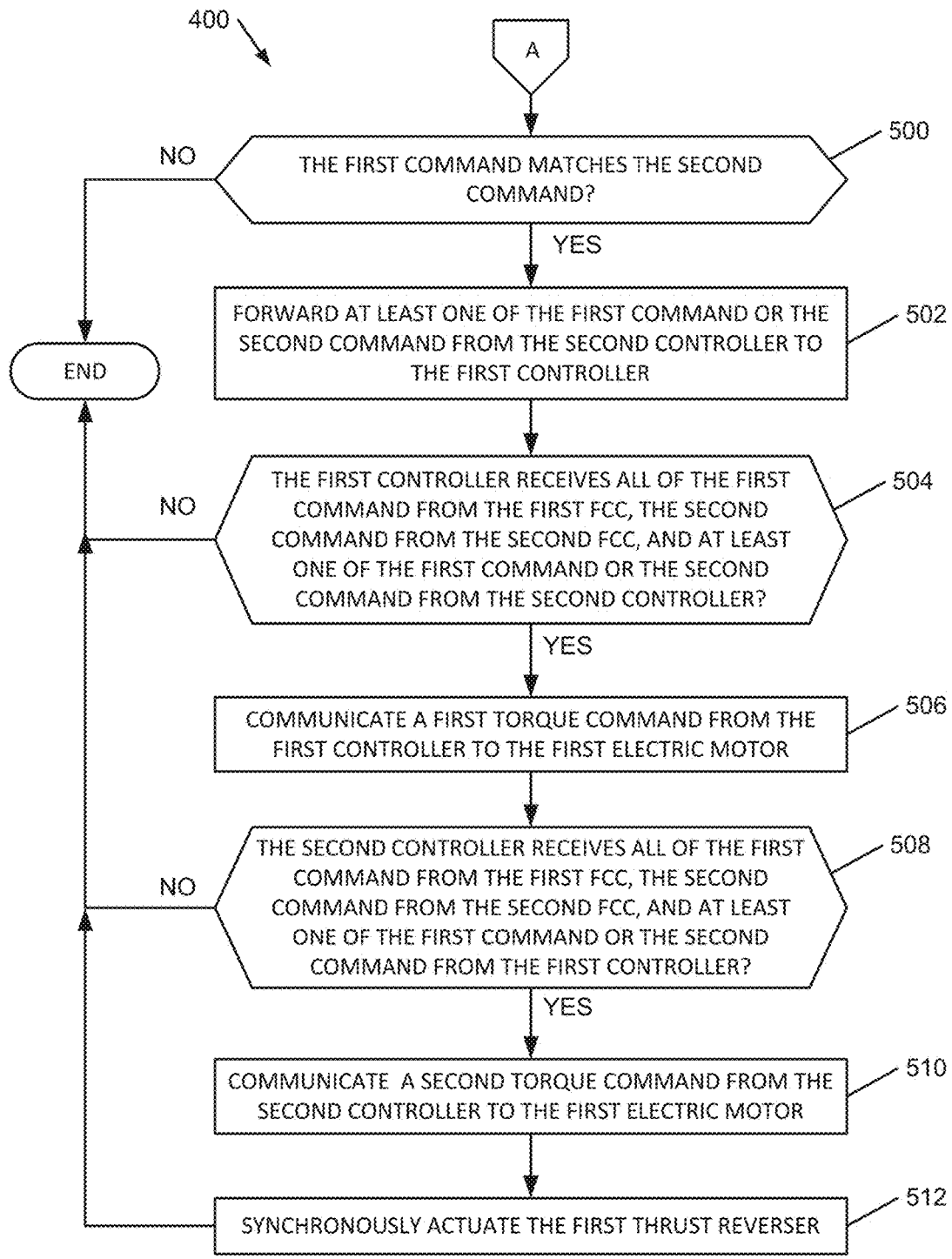

The example method 400 of FIGS. 4-5 may be performed to actuate the first thrust reverser 202. The example method 400 of FIGS. 4-5 begins when the example first FCC 210 communicates a first command to the first controller 306 operatively coupled to the first electric motor 308 and the first thrust reverser 202 (block 402). The first command may be, for example, a command to deploy the first thrust reverser 202, a command to fully retract the first thrust reverser 202, a command to move the first thrust reverser 202 to a commanded position, a command to have the first electric motor 308 output a given amount of torque, and/or one or more different and/or alternative commands. The example second FCC 212 communicates a second command to the first controller 306 (block 404). The second command may be, for example, a command to deploy the first thrust reverser 202, a command to fully retract the first thrust reverser 202, a command to move the first thrust reverser 202 to a commanded position, a command to have the first electric motor 308 output a given amount of torque, and/or one or more different and/or alternative commands. In some examples, the third FCC 214 and the fourth FCC 216 communicate a third command and a fourth command, respectively, to the first controller 306.

The first controller 306 determines if the first command matches the second command (block 406). For example, the first controller 306 may determine that the first command matches the second command by determining that each of the first command and the second command is to deploy the first thrust reverser 202, retract the first thrust reverser 202, move the first thrust reverser 202 to a same commanded position, have the first electric motor 308 output a same or similar amount of torque, and/or determine that the first command and the second command match in one or more different and/or alternative ways.

If the first controller 306 determines that the first command does not match the second command, the example method 400 ends and, thus, the first thrust reverser actuator system 206 does not actuate the first thrust reverser 202. In some examples, if the first thrust reverser actuator system 206 does not actuate the first thrust reverser 202, the second thrust reverser actuator system 208 does not actuate the second thrust reverser 204. If the first controller 306 determines that the first command matches the second command, the first controller 306 forwards at least one of the first command or the second command to the second controller 328 (block 408). For example, if the first command and the second command each includes a same or similar torque to be output by the first electric motor 308 and a same commanded position (e.g., a fully deployed position) of the first thrust reverser 202, the first controller 306 forwards at least one of the first command or the second command to the second controller 328. In some examples, the first controller 306 forwards the first command and/or the second command by formatting the first command and/or the second command, processing the first command and/or the second command, generating one or more commands based on the first command and/or the second command and/or performing other actions.

In some examples employing the first thrust reverser actuator system 206 of FIGS. 2-3, the first controller 306 also receives a third command from the third FCC 214 and a fourth command from the fourth FCC 216. In some examples, the first controller 306 determines if the first command, the second command, the third command and the fourth command match. If the first, second, third and fourth commands match, the first controller 306 forwards at least one of the first, second, third or fourth commands to each of the second controller 328 and the third controller 346. In some examples, if the first controller 306 determines that two or more of the first, second, third and fourth commands do not match (e.g., if the first command is different than the second command), the first controller 306 does not forward any of the first, second, third or fourth commands to the second controller 328 or the third controller 346.

In the illustrated example of FIGS. 4-5, the first FCC 210 also communicates the first command to the second controller 328 (block 410). The second FCC 212 communicates the second command to the second controller 328 (block 412). The second controller 328 determines if the first command matches the second command (block 500). For example, the second controller 328 may determine that the first command matches the second command by determining that each of the first command and the second command is to deploy the first thrust reverser 202, retract the first thrust reverser 202, move the first thrust reverser 202 to a same commanded position, have the second electric motor 330 output a same or similar amount of torque, and/or determine that the first command and the second command match in one or more different and/or alternative ways.

If the second controller 328 determines that the first command does not match the second command, the example method 400 ends. As a result, the first thrust reverser actuator system 206 does not actuate the first thrust reverser 202, and the second thrust reverser system 208 does not actuate the second thrust reverser 204. If the second controller 328 determines that the first command matches the second command, the second controller 328 forwards at least one of the first command or the second command to the first controller 306 (block 502). For example, if the first command and the second command each includes a same or similar torque to be output by the second electric motor 330 and a same commanded position (e.g., a fully deployed position) of the first thrust reverser 202, the second controller 328 forwards at least one of the first command and the second command to the first controller 306. In some examples, the second controller 328 forwards the first command and/or the second command by formatting the first command and/or the second command, processing the first command and/or the second command, generating one or more commands based on the first command and/or the second command and/or performing other actions.

In some examples employing the first thrust reverser actuator system 206 of FIGS. 2-3, the second controller 328 receives a third command from the third FCC 214 and a fourth command from the fourth FCC 216. In some examples, the second controller 328 determines if the first command, the second command, the third command and the fourth command match. If the first, second, third and fourth commands match, the second controller 328 forwards at least one of the first, second, third and fourth commands to each of the first controller 306 and the third controller 346. In some examples, if the second controller 328 determines that two or more of the first, second, third and fourth commands do not match (e.g., if the first command is different than the second command), the second controller 328 does not forward any of the first, second, third or fourth commands to the first controller 306 or the third controller 346.

In some examples, the third controller 346 receives the first command from the first FCC 210, the second command from the second FCC 212, the third command from the third FCC 214, and the fourth command from the fourth FCC 216. In some examples, the third controller 346 determines if the first command, the second command, the third command and the fourth command match. If the first, second, third and fourth commands match, the third controller 346 forwards at least one of the first, second, third and fourth commands to each of the first controller 306 and the second controller 328. In some examples, if the third controller 346 determines that two or more of the first, second, third and fourth commands do not match (e.g., if the first command is different than the second command), the third controller 346 does not forward any of the first, second, third or fourth commands to the first controller 306 or the second controller 328.

In the illustrated example, the first controller 306 determines if the first controller 306 receives all of the first command from the first FCC 210, the second command from the second FCC 212, and at least one of the first command or the second command from the second controller 328 (block 504). Thus, the first controller 306 determines if the first controller 306 receives matching commands from the first FCC 210 and the second FCC 212 and the second controller 328. If the first controller 306 does not receive all of the first command from the first FCC 210, the second command from the second FCC 212, and at least one of the first command and the second command from the second controller, the example method 400 of FIGS. 4-5 ends. If the first controller 306 receives all of the first command from the first FCC 210, the second command from the second FCC 212, and at least one of the first command or the second command from the second controller 328, the first controller 306 communicates a first torque command to the first electric motor 308 (block 506).

In some examples employing the example first thrust reverser actuator system 206, the first controller 306 communicates the first torque command to the first electric motor 308 if the first controller 306 receives matching commands from three or more of the FCCs 210, 212, 214, 216 and/or matching commands from both the second controller 328 and the third controller 346. For example, the first controller 306 may communicate the first torque command if the first controller 306 receives all of 1) the first command from the first FCC 210; 2) the second command from the second FCC 212; 3) the third command from the third FCC 214; 4) the fourth command from the fourth FCC 216; 5) at least one of the first command, the second command, the third command or the fourth command from the second controller 328; and 6) at least one of the first command, the second command, the third command or the fourth command from the third controller 346.

In the illustrated example, the second controller 328 determines if the second controller 328 receives all of the first command from the first FCC 210, the second command from the second FCC 212, and at least one of the first command or the second command from the first controller 306 (block 508). Thus, the second controller 328 determines if the second controller 328 receives matching commands from the first FCC 210, the second FCC 212 and the first controller 306. If the second controller 328 does not receive all of the first command from the first FCC 210, the second command from the second FCC 212, and at least one of the first command or the second command from the first controller 306, the example method 400 of FIGS. 4-5 ends. If the second controller 328 receives all of the first command from the first FCC 210, the second command from the second FCC 212, and at least one of the first command or the second command from the first controller 306, the second controller 328 communicates a second torque command to the second electric motor 330 (block 510).

In some examples employing the example first thrust reverser actuator system 206, the second controller 328 communicates the second torque command to the second electric motor 330 if the second controller 328 receives matching commands from three or more of the FCCs 210, 212, 214, 216 and/or matching commands from both the first controller 306 and the third controller 346. For example, the second controller 328 may communicate the second torque command if the second controller 328 receives all of 1) the first command from the first FCC 210; 2) the second command from the second FCC 212; 3) the third command from the third FCC 214; 4) the fourth command from the fourth FCC 216; 5) at least one of the first command, the second command, the third command or the fourth command from the first controller 306; and 6) at least one of the first command, the second command, the third command or the fourth command from the third controller 346.

In some examples, the third controller 346 communicates a third torque command to the third electric motor 348 if the third controller 346 receives matching commands from three or more of the FCCs 210, 212, 214, 216 and/or matching commands from both the first controller 306 and the second controller 328. For example, the third controller 346 may communicate the third torque command if the third controller 346 receives all of 1) the first command from the first FCC 210; 2) the second command from the second FCC 212; 3) the third command from the third FCC 214; 4) the fourth command from the fourth FCC 216; 5) at least one of the first command, the second command, the third command or the fourth command from the first controller 306; and 6) at least one of the first command, the second command, the third command or the fourth command from the second controller 328. In some examples, the first controller 306, the second controller 328 and the third controller 346 communicate the first torque command, the second torque command and the third torque command, respectively, at substantially a same time.

In the illustrated example, the first electrical actuator 300, the second electrical actuator 302 and the third electrical actuator 304 synchronously actuate the first thrust reverser 202 (block 512). For example, the first electrical actuator 300, the second electrical actuator 302 and the third electrical actuator 304 may apply force to the first thrust reverser 202 at substantially a same time, apply substantially a same amount of force to the first thrust reverser 202, move the first thrust reverser 202 at substantially a same rate and/or speed, and/or synchronously actuate the first thrust reverser 202 in one or more different and/or alternative ways. In some examples, the first electrical actuator 300, the second electrical actuator 302 and the third electrical actuator 304 synchronously actuate the first thrust reverser 202 to a move the first thrust reverser 202 to a commanded position such as, for example, a fully deployed position, a fully retracted position and/or other positions.

Figure 6:
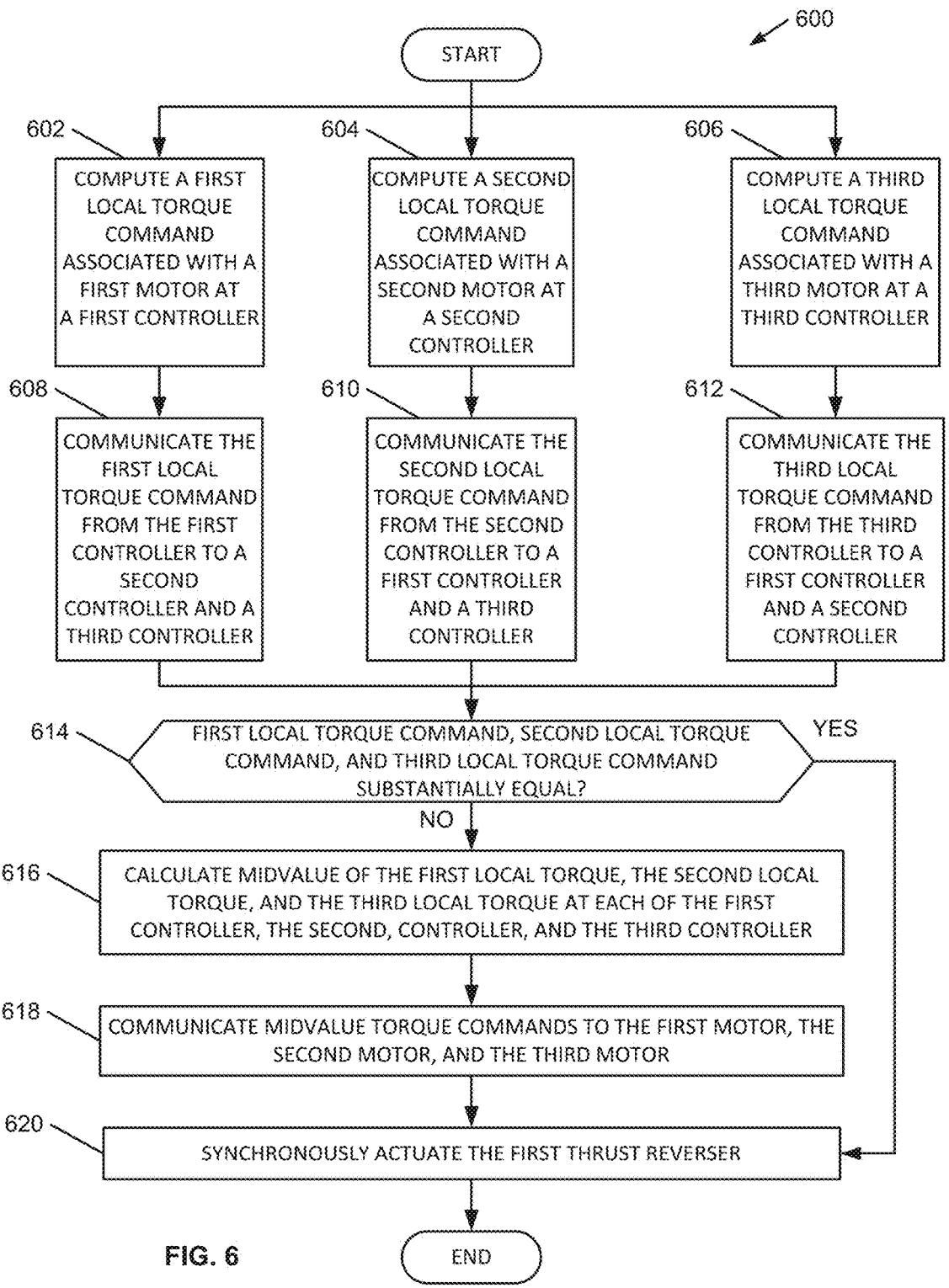
FIG. 6 is a flowchart representative of an example method disclosed herein to generate a torque command to actuate a thrust reverser.

To synchronously actuate the first thrust reverser 202, a common torque command so that each of the first motor 308, the second motor 330, and the third motor 348 output substantially the same torque value. FIG. 6 illustrates an example method 600 for generating a common torque command using a midvalue calculation. In the example method 600, the first controller 306 computes a first local torque command for the first motor 308 based on, for example, electric motor rate and position feedback tracked by sensors or a motor rotor resolver (block 602). Similarly, in the example method 600, the second controller 328 computes a second local torque command for the second motor 330 (block 604) and the third controller 346 computes a third local torque command for the third motor 348 (block 606).

In the example method 600, the first controller 306 communicates the first local torque command to the second controller 328 and the third controller 346 (block 608). The second controller 328 communicates the second local torque command to the first controller 306 and the third controller 346 (block 610). The third controller 348 communicates the third local command to the first controller 306 and the second controller 328 (block 612). Thus, each of the first controller 306, the second controller 328, and the third controller 346 recognizes three local torque commands, namely, the torque command computed by the respective controller and the two local torque commands received from the other of the two controllers.

At block 614 of the example method 600, each of the first controller 306, the second controller 328, and the third controller 346 determine whether the values of the first local torque command, the second local torque command, and the third local torque command are substantially equal. If the values are substantially equal, each of the first controller 306, the second controller 328, and the third controller 346 applies one of the first local torque command, the second local torque command, or the third local torque command to the first motor 308, the second motor 330, and the third motor 348 to synchronously actuate the first thrust reverser 202 (block 620).

If the first local torque command, the second local torque command, the third local torque command are not substantially equal, the example method 600 proceeds to block 616. At block 616, each of the first controller 328, the second controller 328, and the third controller 346 calculates a median value or midvalue of the three torque commands recognized by respective controller. For example, the first controller 306 computes a midvalue of the first local torque command computed by the first controller 306, the second local torque command received from the second controller 328, and the third local torque command received from the third controller 346. Based on the midvalue calculation, the first controller 306 determines a first midvalue torque command.

Also, the second controller 328 computes a midvalue of the second local torque command computed by the second controller 328, the first local torque command received from the first controller 306, and the third local torque command received from the third controller 346. Based on the midvalue calculation, the second controller 328 determines a second midvalue torque command. The third controller 346 computes a midvalue of the third local torque command computed by the third controller 346, the first local torque command received from the first controller 306, and the second local torque command received from the second controller 328. Based on the midvalue calculation, the third controller 346 determines a third midvalue torque command.

In the example method 600, the midvalue torque commands are communicated by the first, second, and third controllers 306, 328, 346 to the respective motors (block 618). For example, the first controller 306 communicates the first midvalue torque command to the first motor 308, which cause the first motor 308 to output a first torque. The second controller 328 communicates the second midvalue torque command to the second motor 330, which cause the second motor 330 to output a second torque. The third controller 346 communicates the third midvalue torque command to the third motor 348, which cause the third motor 348 to output a third torque.

In the example method 600, the first electric motor 308, the second electric motor 330, and the third electric motor 348 output a substantially same amount of torque because each of the first electric motor 308, the second electric motor 330, and the third electric motor 348 output a torque corresponding to the midvalue of the first local torque command, the second local torque command, and the third local torque command. Thus, the example method 600 provides for synchronous actuation of the first thrust reverser 202 (block 620), as each of the first, second, and third motors 308, 330, 348 output substantially the same torque command.

Also, In some examples, to synchronously actuate the first thrust reverser 202 in response to the torque commands calculated via the example method 600, the first controller 306 communicates a first brake release command to the first brake 326, the second controller 328 communicates a second brake release command to the second brake 344, and the third controller 346 communicates a third brake release command to the third brake 362. In response, the example first brake 326, the example second brake 344 and the example third brake 362 disengage and/or de-energize to enable the first electric motor 308, the second electric motor 330 and the third electric motor 348, respectively, to output torque to actuate the first thrust reverser 202. When the example first thrust reverser 202 is in the commanded position, the first brake 326, the second brake 344 and the third brake 362 re-engage and/or re-energize to secure the first thrust reverser 202 in the commanded position.

Figure 7:
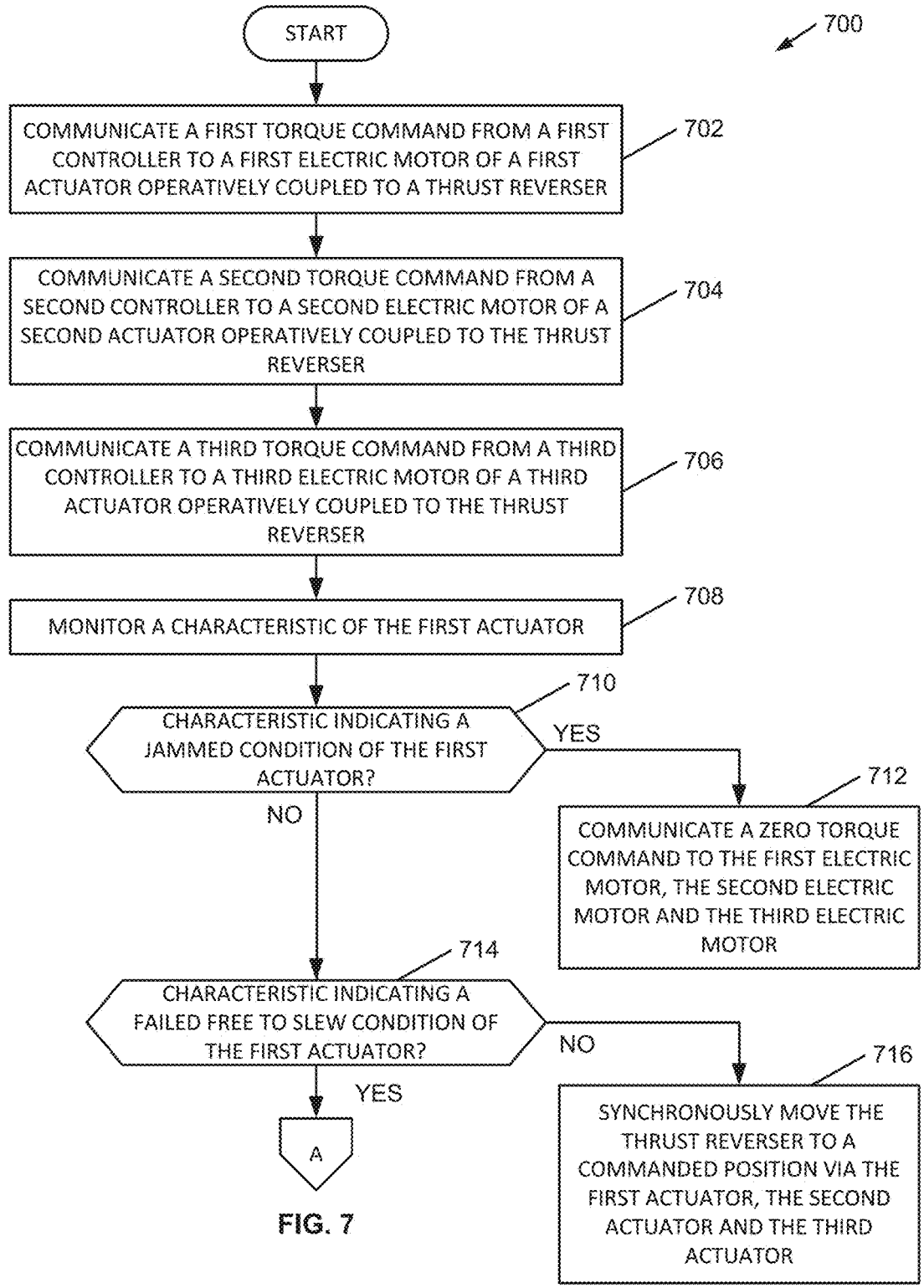
FIGS. 7-8 are flowcharts representative of an example method to detect one or more fault conditions of the first thrust reverser actuator system of FIG. 1 and take corrective action based on the detected fault condition.
Figure 8:
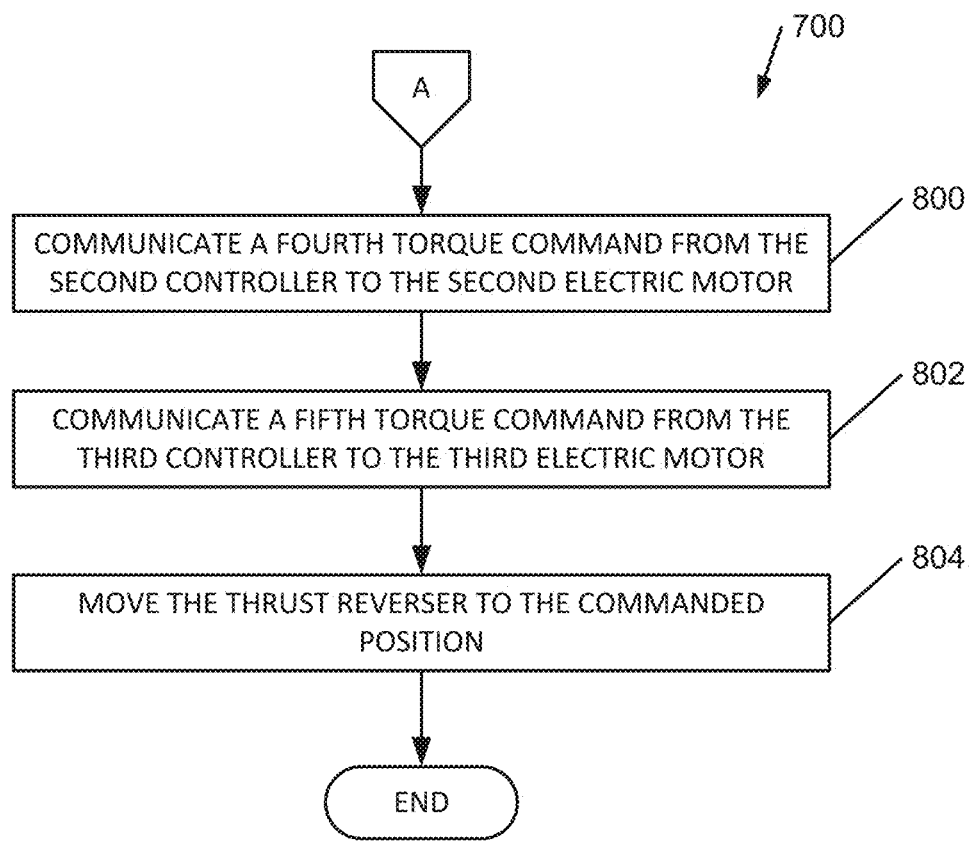

The example method 700 of FIGS. 7-8 may be performed to detect one or more fault conditions of the first thrust reverser actuator system 206 and take corrective action based on the detected fault condition. The example method 700 of FIGS. 7-7 begins when the example first controller 306 communicates a first torque command to the first electric motor 308 of the example first electrical actuator 300 coupled to the first thrust reverser 202 (block 702). The example second controller 328 communicates a second torque command to the second electric motor 330 of the second electrical actuator 302 operatively coupled to the first thrust reverser 202 (block 704). The example third controller 346 communicates a third torque command to the third electric motor 348 of the third electrical actuator 304 operatively coupled to the first thrust reverser 202 (block 706).

In the illustrated example, the first controller 306 monitors a characteristic of the first electrical actuator 300 (block 708). For example, the first controller 306 may monitor a torque output by the first electric motor 306, a position of a portion of the first electrical actuator 300 (e.g., the first drive nut 324, the first ball screw 322 and/or any other portion of the first electrical actuator), a position error of the portion of the first electrical actuator 300, a rate of movement of one or more portions of the first electrical actuator 300 (e.g., the first ball screw 322, the first drive nut 324, etc.), a state of the first brake 326 (e.g., energized, de-energized, engaged, disengaged, and/or one or more additional and/or alternative states) and/or one or more additional and/or alternative characteristics of the first electrical actuator 300. The first controller 306 determines if the characteristic indicates a jammed condition of the first electrical actuator 300 (block 710). For example, if the first electric motor 308 is generating torque and the first drive nut 324 is not moving (e.g., translating), the first controller 306 determines that the first electrical actuator 300 is in the jammed condition.

In the illustrated example, if the example first controller 306 determines that the characteristic indicates the jammed condition, the first controller 306 communicates a zero torque command to the first electric motor 308, the second controller 328 communicates a second zero torque command to the second electric motor 330, and the third controller 346 communicates a third zero torque command to the third electric motor 348 (block 712). In some examples, in response to the first zero torque command, the second zero torque command and the third zero torque command, the first electric motor 308, the second electric motor 330 and the third electric motor 348, respectively, de-energize and/or stop generating torque to actuate the first thrust reverser 202. As a result, the example first electrical actuator 300 decreases a likelihood that the jammed condition leads to damage of the first electrical actuator 300 and/or stall currents being drawn by the first electric motor 308, the second electric motor 330 and/or the third electric motor 348.

In some examples, the second controller 328 determines if the second electrical actuator 302 is in a jammed condition, and the third controller 346 determines if the third electrical actuator 304 is in a jammed condition. If one or more of the second electrical actuator 302 or the third electrical actuator 304 is in the jammed condition, the first controller 306 communicates the zero torque command to the first electric motor 308, the second controller 328 communicates the second zero torque command to the second electric motor 330, and the third controller 346 communicates the third zero torque command to the third electric motor 348.

If the characteristic does not indicate the jammed condition, the first controller 306 determines if the characteristic indicates a failed free to slew condition of the first electrical actuator 300 (block 714). In some examples, the first controller 306 uses one or more characteristics to determine if the first electrical actuator 300 is in the jammed condition and uses one or more different and/or alternative characteristics to determine if the first electrical actuator 300 is in the failed free to slew condition. For example, a failed free to slew condition can be detected based on one or more algorithms that determine the operational health of the inverter 310 and/or the motor 308 based on performance of the inverter 310 and/or the motor 308. For example, if the inverter 310 fails to open, no currents in the motor windings will be generated. The failure of the inverter 310 to open can be detected by comparing the current (or lack thereof) in the motor windings to a current, or torque command. In the illustrated example, if the first controller 306 determines that the characteristic indicates a free to slew condition, the second controller 328 and the third controller 346 continue to communicate torque commands to the second inverter 332 and the third inverter 350 to move the first thrust reverser 202 to a commanded position move the first thrust reverser 202 to a commanded position (block 716). The commanded position may be, for example, a fully deployed position, a fully retracted position and/or other positions.

In the illustrated example, if the first controller 306 determines that the characteristic indicates the failed free to slew condition of the first electric motor 308, the second controller 328 communicates a fourth torque command to the second electric motor 330 (block 800). The example third controller 346 communicates a fifth torque command to the third electric motor 348 (block 802). In some examples, the second electric motor 330 and/or the third electric motor 348 generate more torque in response to the fourth torque command and the fifth torque command, respectively, than in response to the first torque command, the second torque command and/or the third torque command. The second electrical actuator 302 and the third electrical 304 actuator move the first thrust reverser 202 to the commanded position (block 804).

Figure 9:
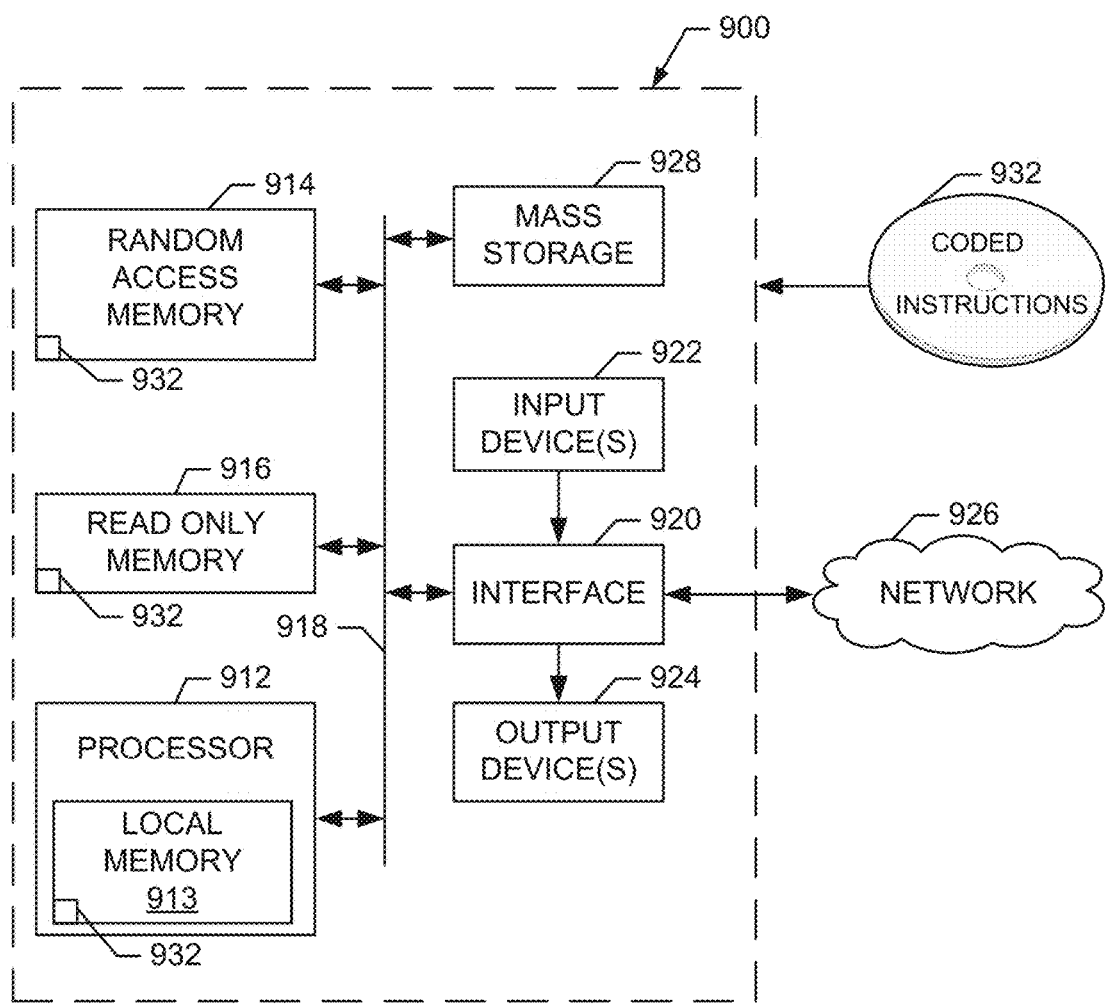
FIG. 9 is a block diagram of an example processor platform for use with the examples disclosed herein.

FIG. 9 is a block diagram of an example processor platform 900 capable of executing instructions to implement the example methods of FIGS. 4-8 to implement the first thrust reverser actuator system 206 of FIG. 3. The processor platform 900 can be, for example, a server, a computer, a mobile device an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 816 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 820 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the example method and apparatus disclosed herein may be stored in the mass storage device 828, in the volatile memory 914, in the non-volatile memory 916, and/or on a removable tangible computer readable storage medium such as a CD or DVD.

From the foregoing, it will be appreciated that the above disclosed methods, apparatus and articles of manufacture may be used to actuate an aircraft thrust reverser via a thrust reverser actuator system employing a plurality of electric motors. By employing the electric motors, the example thrust reverser actuator systems disclosed herein are lighter and more reliable than traditional hydraulic systems used to actuate thrust reversers. For example, some of the example thrust reverser actuator systems disclosed herein may be two or more times faster and at least twenty-five percent lighter than traditional hydraulic systems used to actuate thrust reversers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    a first flight computer;
    a second flight computer;
    a first controller to communicate with the first flight computer and the second flight computer;
    a first electric motor to communicate with the first controller;
    a second controller to communicate with the first flight computer and the second flight computer;
    a second electric motor to communicate with the second controller; and
    an aircraft thrust reverser operatively coupled to the first electric motor and the second electric motor, each of the first controller and the second controller to receive a first command from the first flight computer and a second command from the second flight computer, the first controller to control the first electric motor based on the first command and the second command, the second controller to control the second electric motor based on the first command and the second command, the first electric motor and the second electric motor to synchronously move the aircraft thrust reverser.

2. The apparatus of claim 1, further comprising:
    a first bus to communicatively couple the first flight computer to the second flight computer; and
    a second bus to communicatively couple the first controller to the second controller.

3. The apparatus of claim 2, wherein the first controller is to forward at least one of the first command or the second command to the second controller via the second bus, the second controller is to command the second electric motor to deploy the aircraft thrust reverser in response to receiving all of 1) the first command from the first flight computer, 2) the second command from the second flight computer, and 3) at least one of the first command and the second command from the first controller.

4. The apparatus of claim 1 further comprising an electromagnetic brake operatively coupled to the first electric motor.

5. The apparatus of claim 4, wherein the electromagnetic brake is to prevent deployment of the aircraft thrust reverser if the brake is engaged and at least one of the first electric motor or the second electric motor is generating torque to actuate the aircraft thrust reverser.

6. The apparatus of claim 1 further comprising a transmission operatively coupled to the first electric motor, the transmission having a gear reduction gear ratio.

7. The apparatus of claim 6 further comprising a ball screw operatively coupled to the transmission.

8. A method, comprising:
    communicating a first command from a first flight computer to a first controller, the first controller communicatively coupled to a first electrical actuator of an aircraft thrust reverser;
    communicating the first command from the first flight computer to a second controller, the second controller communicatively coupled to a second electrical actuator of the aircraft thrust reverser;
    communicating a second command from a second flight computer to the first controller;
    communicating the second command from the second flight computer to the second controller;
    forwarding at least one of the first command or the second command from the first controller to the second controller;
    forwarding at least one of the first command or the second command from the second controller to the first controller; and
    deploying the aircraft thrust reverser via the first electrical actuator and the second electrical actuator if the first controller receives the first command from the first flight computer, the second command from the second flight computer, and at least one of the first command or the second command from the second controller.

9. The method of claim 8, wherein deploying the aircraft thrust reverser comprises:
    communicating a first brake release command to a first brake operatively coupled to the first electrical actuator; and
    communicating a torque command to a first electric motor of the first electrical actuator.

10. The method of claim 8 further comprising:
    monitoring a first position of a portion of the first electrical actuator;
    determining if the first electrical actuator is in a jammed condition based on the first position; and
    communicating a zero torque command to a first electric motor of the first electrical actuator if the first electrical actuator is in the jammed condition.

11. The method of claim 8 further comprising:
    communicating a first torque command to a first electric motor of the first electrical actuator, the first electric motor to generate a first torque based on the first torque command;
    monitoring a first rate of movement of a portion of the first electrical actuator;
    determining if the first rate fails to meet a predetermined rate; and communicating a second torque command to the first electrical actuator if the first rate fails to meet the predetermined rate, the first electrical actuator to generate a second torque greater than the first torque based on the second torque command.

12. The method of claim 8, wherein a first electric motor of the first electrical actuator is to output a first torque based on a midvalue of the first command and the second command and a second electric motor of the second electrical actuator is to output a second torque based on the midvalue.

13. An apparatus, comprising:
a first controller to communicate with a first flight computer and a second flight computer of an aircraft;
a second controller to communicate with the first flight computer and the second flight computer, the first flight computer to communicate a first deployment command to each of the first controller and the second controller and the second flight computer to communicate a second deployment command to each of the first controller and the second controller;
a thrust reverser;
a first electrical actuator coupled to the thrust reverser, the first electrical actuator to be communicatively coupled to the first controller and the second controller; and
a second electrical actuator coupled to the thrust reverser, the second electrical actuator to be communicatively coupled to the second controller, the first controller to actuate the first electrical actuator based on the first deployment command and the second deployment command, the second controller to actuate the second electrical actuator based on the first deployment command and the second deployment command, the first electrical actuator and the second electrical actuator to synchronously actuate the thrust reverser.

14. The apparatus of claim 13, wherein the first electrical actuator comprises at least one of a brushless direct current electric motor or a permanent magnet electric motor.

15. The apparatus of claim 14, wherein the first electrical actuator comprises an electromagnetic brake.

16. The apparatus of claim 13, wherein the first electrical actuator comprises an electric motor and a ball screw, the ball screw operatively coupled to the electric motor.

17. The apparatus of claim 13 further comprising a cross data channel link to communicatively couple the first controller to the second controller.

18. The apparatus of claim 17, wherein the second controller is to communicate the first deployment command and the second deployment command to the first controller via the cross data channel link, the first controller to actuate the first electrical actuator if the first controller receives all of 1) the first deployment command from first flight computer, 2) the second deployment command from the second flight computer, and 3) at least one of the first deployment command or the second deployment command from the second controller.

19. The apparatus of claim 13, wherein the thrust reverser is a first thrust reverser operatively coupled to a first engine, and further comprising a second thrust reverser operatively coupled to a second engine, the first thrust reverser to actuate synchronously with the second thrust reverser.

* * * * *